United States Patent
Brociner et al.

[15] 3,659,718
[45] May 2, 1972

[54] FILTER ELEMENTS

[72] Inventors: Ronald Eric Brociner; William Moon; Raymond Collins, all of Cornwall, England

[73] Assignee: English Clays Lovering Pochin and Company Limited, Cornwall, England

[22] Filed: Sept. 23, 1969

[21] Appl. No.: 860,366

[30] Foreign Application Priority Data

Sept. 27, 1968 Great Britain.....................46,159/68

[52] U.S. Cl..............................210/333, 210/346, 210/486
[51] Int. Cl.........................................................B01d 29/14
[58] Field of Search....................210/486, 487, 346, 3.33

[56] References Cited

UNITED STATES PATENTS

| | | |
|---|---|---|
| 875,687 | 1/1908 | Blaisdell et al.........................210/486 |
| 1,096,132 | 5/1914 | Shepherd...........................210/486 X |
| 2,968,404 | 1/1961 | Hotz..................................210/486 X |
| 3,067,504 | 12/1962 | Lubben et al.....................210/486 X |
| 3,481,479 | 12/1969 | Hoskins et al....................210/486 X |

*Primary Examiner*—Samih N. Zaharna
*Attorney*—Larson, Taylor and Hinds

[57] ABSTRACT

A filter thickener incorporating a filter element which is formed from a bag of filter material substantially filled with a packing material through which liquid can permeate. The filter element is advantageously in the form of a filter leaf which comprises a flat bag of filter material containing packing material in the form of a flexible mat or mesh made from a natural or synthetic polymeric material, and opposing sides of the flat bag of filter material are preferably joined together in a manner which divides the bag of filter material into a plurality of strips or annuli.

3 Claims, 8 Drawing Figures

Patented May 2, 1972

Patented May 2, 1972

FILTER ELEMENTS

BACKGROUND OF THE INVENTION

This invention relates to filter thickeners.

The thickening of a suspension of solids in a liquid is conventionally performed by flocculating the suspension and allowing the flocs of solid particles to settle under gravity in a suitable tank. Clear liquid is allowed to overflow from the top of the tank and the thickened suspension is withdrawn from the bottom of the tank by a spigot or pump. This process is often very slow either because the difference in specific gravity between the solids and the liquid is small or because the flocs have become entangled to form a continuous network which cannot settle quickly through the liquid. It is well known to thicken a suspension by employing a filter thickener which usually comprises a tank provided with a plurality of filter elements which are arranged so as to be submerged beneath the surface of a suspension in the tank and which are connected alternately to a source of vacuum and a source of back-flushing liquid. The known filter elements usually comprise a rigid frame, generally made of metal or wood, which is covered with a filter material. By the alternate application of suction and back-flushing liquid to the filter elements there is formed on the filter elements a filter cake which is subsequently dislodged and drops to the bottom of the tank from where it can be removed in any convenient manner. In order to achieve a clean release of filter cake from the filter element it is necessary for the back-flushing liquid to exude through the filter material so as to form a lubricating film between the filter cake and the surface of the filter element. In order to force the back-flushing liquid through the filter material a considerable hydraulic pressure must be applied to the back-flushing liquid and, if the filter material is a cloth, it dilates under the effect of the hydraulic pressure. Distortion of the filter element is inhibited by the wooden or metallic frame but, nevertheless, there is a large increase in the effective volume of the filter element when the application of suction ceases and the application of back-flushing liquid begins. This means that a large volume of back-flushing liquid must be supplied to the filter elements. Furthermore, the presence of the metal or wood frame increases the weight of the filter element which is disadvantageous.

It is an object of the present invention to provide a filter thickener incorporating a filter element which, in use, is of substantially constant, effective volume.

SUMMARY OF THE INVENTION

According to the present invention there is provided a filter thickener which comprises a tank to which a suspension to be thickened can be supplied, at least one filter element disposed in said tank and comprising a bag of filter material substantially filled with a packing material through which liquid can permeate, means for establishing a pressure differential between the exterior and interior of the bag of filter material whereby filtrate passes from the exterior to the interior of the bag of filter material, means for extracting filtrate from the interior of the bag of filter material, and means for removing from the surface of the bag of filter material filter cake which has formed thereon.

DESCRIPTION OF THE PREFERRED EMBODIMENTS

The bag of filter material should be formed from a material which is inert to the suspension being treated, e.g., from a material which is resistant to bacteria and/or solvents present in the suspension. In the case of aqueous suspensions the bag of filter material is advantageously formed from a natural or synthetic polymeric material such as nylon or polyethylene terephthalate.

Similarly, the packing material, which substantially fills the bag of filter material, is preferably formed from an inert material.

Generally, a filter thickener in accordance with the invention will comprise a plurality of the filter elements.

The filter cake is advantageously removed from the surface of the bag of filter material by a back-flushing process in which the filtrate is supplied under pressure to the interior of the bag of filter material. The filter cake can be removed from the bag of filter material with the latter in the tank, in which case the tank is provided with means for removing the filter cake from the bottom of the tank, or the filter cake can be removed from the bag of filter material after the latter has been removed from the tank.

The filter elements used in the filter thickener of the present invention can be of the type generally known as a filter leaf in which case the bag of filter material is substantially flat and the packing material is preferably in the form of a flexible mat or mesh which is advantageously made of a synthetic or natural polymeric material, for example polypropylene, polyethylene or poly(vinyl chloride). The bag of filter material is advantageously suspended from a pipe which is provided with one or more apertures whereby the pipe communicates with the interior of the filter bag and enables the filtrate to be extracted from the filter bag. Advantageously, the bag of filter material is formed from a single piece of filter material which is hung over a length of pipe and the two sides joined together along their edges. Similarly, it is advantageous if the flexible mat or mesh of packing material is formed from a single piece of material which is hung over the length of pipe between the pipe and the filter material. Alternatively, the filter elements can be of the type generally known as a filter tube in which case the bag of filter material is of essentially cylindrical shape, preferably of circular or substantially circular cross-section, and the packing material is preferably a particulate material, for example beads of glass or of a synthetic or natural polymeric material.

When the filter element is of the type generally known as a filter leaf the opposing sides of the bag of filter material, which constitute the filtering area, are restrained from dilating to any significant extent by being joined together, for example by stitching, in a manner which divides the bag into a plurality of strips or annuli, each of which is preferably between 2 and 6 inches in width. In this way sufficient hydraulic pressure can be exerted to force back-flushing liquid through the filter material without causing a large increase in volume of the filter bag so that there is no need to supply a large volume of back-flushing liquid. In addition, the filter elements can be used close together without their surfaces coming into contact during the back-flushing operation. It is also advantageous if at least the top edge of the filter element is made impermeable so as to prevent the build-up of filter cake on the top edge of the filter element which promotes the complete discharge of the filter cake from the filtering area. This can be achieved by securing a strip of impermeable material which can be, for example, in the form of adhesive tape, to the edges, particularly the upper edge, of the filter element.

The filter elements can be suspended from a support which is adapted to float on the surface of the suspension being treated. A pressure differential is established between the exterior and interior of the bag of filter material either by applying suction to the interior of the filter bag or by applying pressure to the exterior of the filter bag. Suction is applied to the interior of the bag of filter material or pressure is applied to the exterior of the bag of filter material for a period which depends on the permeability of the filter cake being formed on the filter element. In general, it is found that the filter period will be equal to or longer than the time taken to remove the cake from the bag of filter material. In most cases it is found that filter periods ranging from 1 minute to 7 minutes will be most satisfactory although it is possible that periods of up to 12 minutes may, in some cases, be desirable. As noted above, in a preferred embodiment of the invention the filter cake is removed from the bag of filter material by a back-flushing process and, in this case, each period of suction or of applied pressure is followed by a period of back-flushing which generally lasts not more than 1 minute to remove the filter cake from the surface of the bag of filter material. A sequence of suction and back-flushing operations may be performed continuously by using a reversible pump and electric motor which can apply suction to the interior of the filter elements to withdraw filtrate and, also, by changing the direction of the pump, force filtrate back through the filter elements to dislodge the cake from the surfaces thereof. The use of correct time periods for the suction and back-flushing operations can be ensured by electronic or mechanical timing apparatus to control the reversing switch on the electric motor which drives the pump.

For a better understanding of the invention, and to show how the same may be carried into effect, reference will now be made, by way of example, to the accompanying drawings in which.

Figure 1:
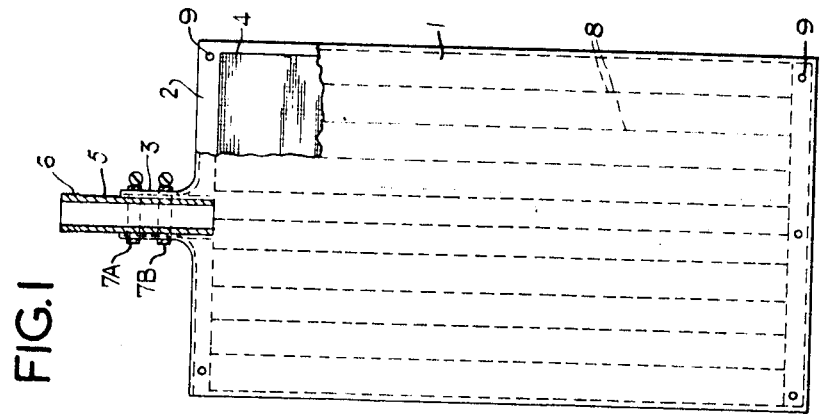

Referring first to FIG. 1, there is shown a filter element in the form of a filter leaf and comprising a bag formed from two pieces of 7 oz.nylon filter cloth 1 and 2, each substantially rectangular in shape but with a neck portion 3, which are sewn together around their edges. Sandwiched between the two pieces of filter cloth and substantially filling the bag formed therefrom is a rectangular piece of plain-woven split-film polypropylene matting 4 which forms a flexible packing material. Between the two neck portions 3 of the pieces of filter cloth is inserted a short length of steel pipe 5 open at both ends and with a threaded portion 6 at the outer end. The neck portions of the pieces of filter cloth are secured to the pipe by means of two JUBILEE clips 7A and 7B. The bag of filter material is divided into a plurality of strips by means of seams 8 sewn 4 inches apart through the two pieces of filter cloth 1 and 2 and the polypropylene matting 4. Eyelets 9 are provided for attaching the filter element to a supporting framework which will be immersed in a suspension which is to be thickened.

Figure 2:
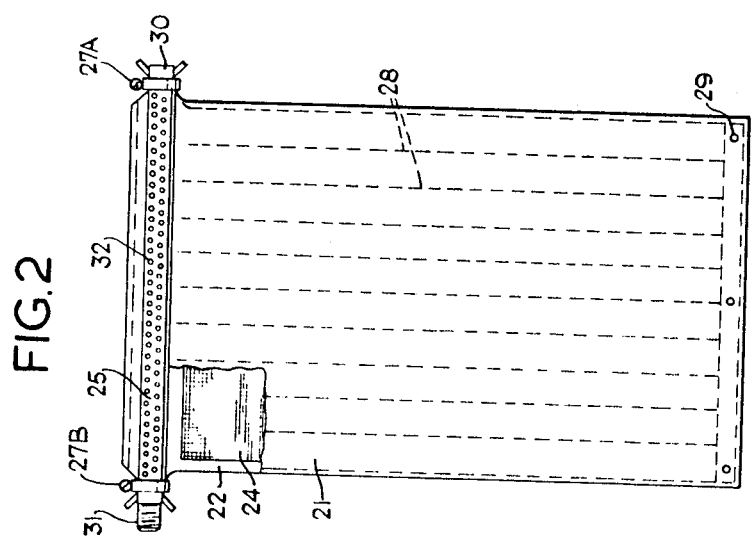

Referring next to FIG. 2, there is shown a filter element in the form of a filter leaf and comprising a bag formed from two pieces of polyethylene terephthalate filter cloth 21 and 22. Sandwiched between the pieces of filter cloth 21 and 22 and substantially filling the bag formed therefrom is a rectangular piece of plain-woven split-film polypropylene matting 24 which forms a flexible packing material. The two pieces of filter cloth are sewn together around three of their sides and on the fourth side the layers of filter cloth enclose a length of steel pipe 25 closed at one end 30 and provided with a screw thread at the other end 31. The pieces of filter cloth are secured to the steel pipe 25 by means of JUBILEE clips 27A nd 27B. The steel pipe 25 is perforated with 200 holes 32 of one-eighth inch diameter to permit the withdrawal by suction of filtrate and the introduction of back-flushing liquid. The bag of filter material is divided into a plurality of strips four inches in width by means of seams 28 sewn through two pieces of filter cloth and the polypropylene matting. Eyelets 29 are provided for attaching the filter element to a framework.

Figure 3:
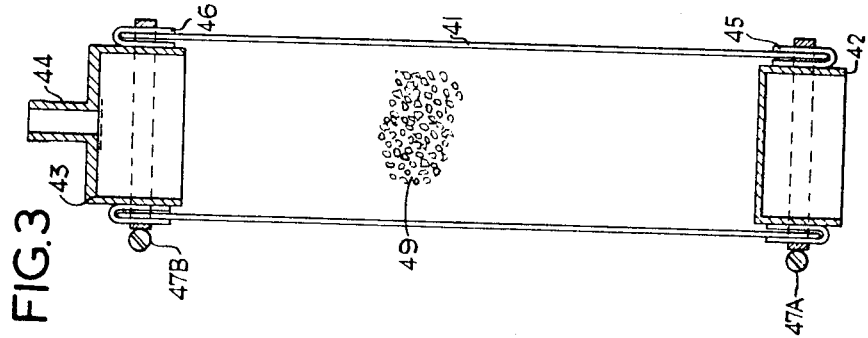
FIGS. 1, 2, 3 and 4 are embodiments of filter elements which can be used in filter thickeners in accordance with the present invention.

In FIG. 3 there is shown a filter element in the form of a filter tube and comprising a bag of filter material which is essentially of cylindrical shape. The bag comprises a cylindrical tube 41 made from 7 oz.nylon filter cloth woven as a tube and without a seam. The filter element also comprises a lower end-piece 42, and an upper end-piece 43 which communicates with a length of pipe 44 to which can be connected a conduit for applying suction to the interior of the tube or for supplying liquid for back-flushing. The cylindrical tube of filter cloth 41 is secured to the lower end-piece 42 and to the upper end-piece 43 by means of JUBILEE clips 47A and 47B respectively. Annular rubber cuffs 45 and 46 form seals between the end-pieces and the filter cloth 41 and protect the filter cloth 41 from damage by the JUBILEE clips. The interior of the bag of filter cloth 41 is packed with an inert particulate material 49. Materials which have been successfully used as packing material include beads of glass or nylon having a size in the range one-sixteenth to three-eighth inch.

Figure 4:
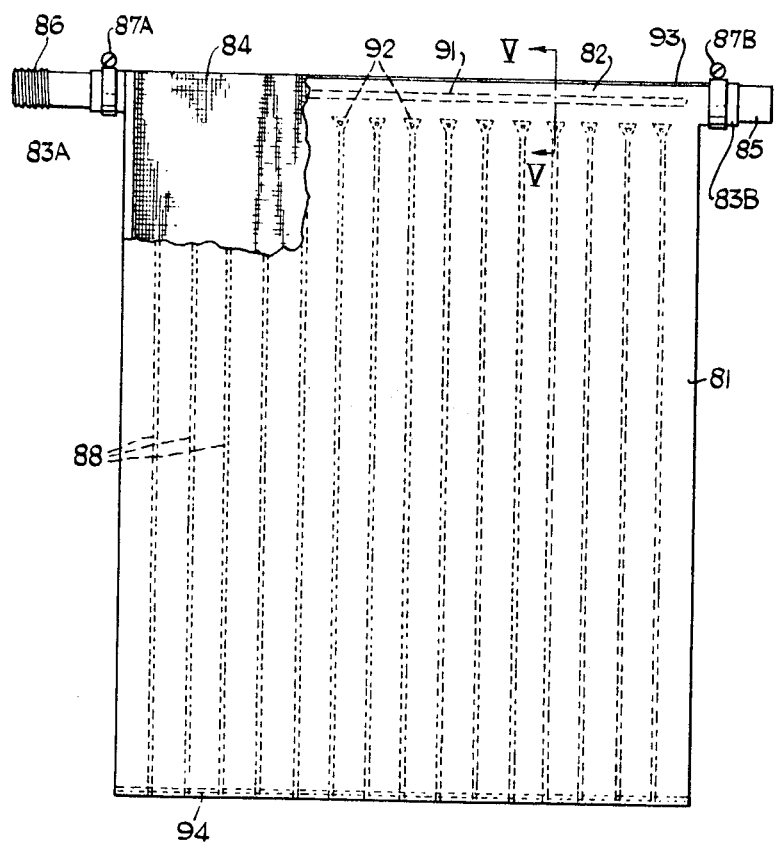
Figure 5:
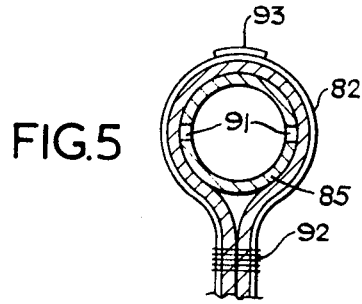
FIG. 5 is a cross-section on the line V—V of FIG. 4.

Referring to FIGS. 4 and 5, there is shown a filter element in the form of a filter leaf which has greater strength and resistance to bursting under the action of back-flushing liquid, than the filter elements shown in FIGS. 1 and 2. A bag measuring approximately 5 feet by 4 feet is formed from a single piece of 9 oz. per square yard nylon filter cloth which is folded so as to comprise two substantially flat, rectangular portions 81 and a substantially cylindrical sleeve portion 82 at the top. The rectangular portions are sewn together along the two sides, leaving the projecting ends 83A and 83B of the sleeve portion, the bag of filter cloth then being turned inside out so that the free edges are on the inside of the bag. A substantially rectangular piece of plain-woven, split-film polypropylene matting 84 is folded double and is introduced with the fold uppermost between the two layers of cloth. A length of steel pipe 85 closed at one end and provided at the other end with a screw thread 86 for facilitating connection to a suitable manifold is inserted into the sleeve portion 82 of the bag so that the polypropylene matting 84 forms a loop round the pipe. The pipe is provided with two elongated slots 91 one-fourth inch in width and of a length slightly less than the width of the polypropylene matting. The bag is secured to the pipe by means of two JUBILEE clips 87A and 87B. The bag of filter cloth is then divided into vertical strips each 3 inches in width by double seams 88, the seams in each pair being about one-eighth to one-fourth inch apart. In order to prevent bursting of the stitches at the sleeve portion of the bag triangular darts 92 are provided each comprising stitches in the pattern of a double triangle. These triangular darts inhibit the failure of the vertical dividing seams at the junction between the flat and sleeve portions of the bag. The free ends at the open bottom end of the bag are then tucked in round the free ends of the polypropylene matting 84 and the bag is closed by a double seam 94. A strip of adhesive tape 93 is provided along the top edge of the filter element to prevent the formation of filter cake here and to promote complete discharge of the filter cake during the back-flushing period.

Figure 6:
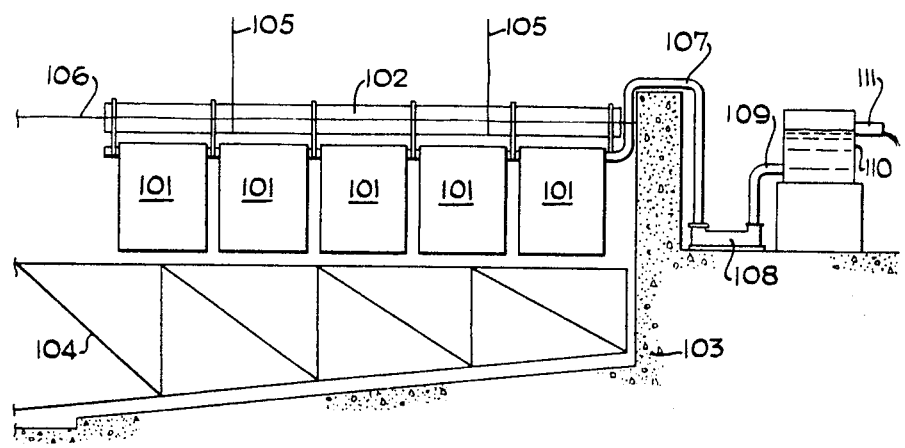
FIGS. 6, 7 and 8 are embodiments of filter thickeners in accordance with the present invention.

In FIG. 6 there is shown a filter thickener which comprises filter elements in the form of filter leaves 101 connected together in batteries of five, each battery being suspended from a tubular float 102 formed from 6 inch diameter polyvinyl chloride tubing in an open concrete-walled tank 103 provided with a rotating rake 104. Suspension chains 105 are also provided to prevent the bottom edges of the filter leaves from contacting the rotating rake if the level of the suspension in the tank falls. The suspension level is shown at 106. The batteries of filter elements are connected by means of flexible pipes 107 to a pump 108 driven by a reversible electric motor (not shown). The delivery of the pump passes through a conduit 109 to a header tank 110. An overflow pipe 111 is provided to maintain a constant level in the header tank. The electric motor driving the pump is first operated in the direction which will apply suction to the filter leaves and withdraw filtrate from the suspension in the tank 103 into the header tank 110. This phase preferably lasts about 5 minutes. The electric motor is then reversed so as to supply filtrate from the header tank 110 under pressure to the filter leaves so as to dislodge the cake which has formed on the outer surface of the leaves. The cake falls to the bottom of the tank 103 whence the thickened slurry is discharged by a spigot or pump (not shown). The back-flushing phase preferably lasts about ½ minute. The cycle of suction and back-flushing phases can be repeated continuously by means of suitable timing apparatus. In one particular test the filter thickener of the present invention was used to thicken a suspension of china clay in water so that when a suspension containing 6 percent by weight of china clay was fed to the tank 103 a thickened suspension containing 37 percent by weight of china clay was discharged from the bottom of the tank.

Figure 7:
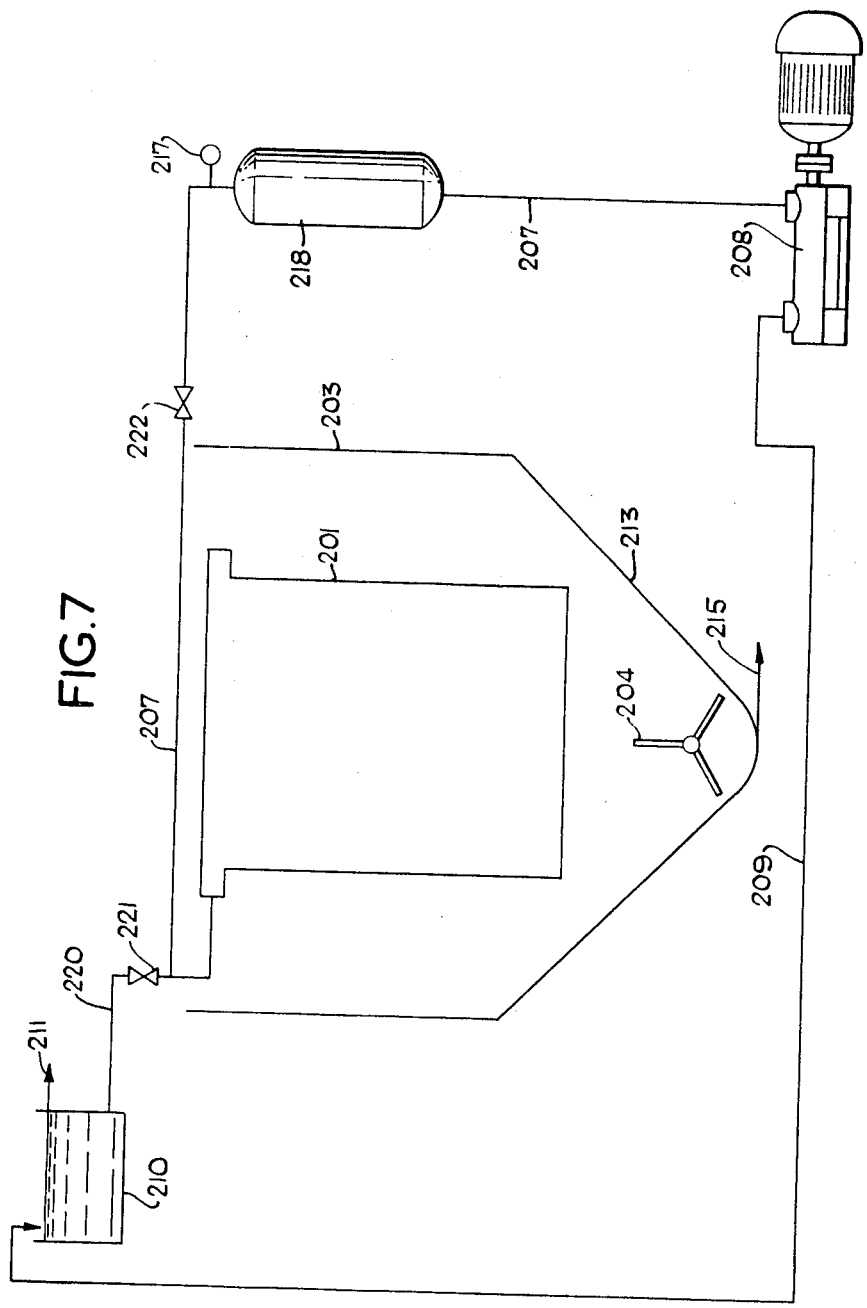

FIG. 7 shows a filter thickener which has the advantages of inhibiting bursting of the filter elements during the back-flushing stage and of providing faster evacuation of the back-flushing liquid at the completion of the back-flushing period. An unthickened mineral suspension is supplied to a tank 203 having a bottom portion 213 of funnel-shaped cross-section. The tank 203 is provided with a stirrer 204 which comprises pegs mounted in a spiral on a horizontal rotating shaft. The tank contains a battery of ten filter elements 201 each measuring approximately 5 feet by 4 feet. Suction is applied to the interior of each of the filter elements by means of a vacuum pump 208 which communicates with the filter elements through a conduit 207. Between the vacuum pump 208 and the filter elements 201 there are provided a vacuum gauge 217 and a reservoir 218. Filtrate withdrawn from the interior of the filter elements 201 by the vacuum pump 208 is pumped through a conduit 209 to a tank 210 provided with an overflow conduit 211, the tank 210 being at a slightly higher level than the tank 203. The tank 210 communicates with the interior of the filter elements by a conduit 220 and automatic timed valves 221 and 222 are provided in conduits 220 and 207 respectively. At the start of a cycle, valve 222 is closed and valve 221 open and the back-flushing period has just been completed so that the filtering area of the filter elements is clean of cake and the interior of each of the filter elements is full of filtrate. The reservoir 218 is almost completely empty of filtrate and the vacuum in the conduit 207 is in the range 28-30 inches of mercury. The valve 222 is then opened and valve 221 closed, filtrate in the interior of the filter elements is rapidly withdrawn into the reservoir 218 and vacuum is applied to the interior of the filter elements. Filtrate removed from the filter elements is pumped to the tank 210 which maintains a constant hydraulic head of filtrate, excess filtrate overflowing through the conduit 211. The reservoir 218 is provided because it has been found that, in the absence of such a reservoir, as filter cake accumulates on the filtering area of the filter elements the flow of filtrate through the filter cloth is restricted and, as a result, the throughput of the vacuum pump is reduced and there is a tendency for cavitation to set in. The reservoir 218 enables the vacuum pump 208 to operate at full throughput throughout the suction period by pumping filtrate out of the reservoir and at the same time provides a vacuity of high capacity into which all the filtrate contained in the filter elements can be rapidly withdrawn so that time is not wasted in the suction period building up the required vacuum in the interior of the filter elements. At the completion of the prescribed suction period, the valve 222 is automatically closed under time control and valve 221 is simultaneously opened. This allows filtrate to flow under gravity from the tank 210 into the interior of the filter elements 201 to dislodge the cake and cause it to fall to the bottom of the tank 203. After the prescribed back-flushing period the state of valves 222 and 221 is reversed and the cycle begins again. Thickened slurry is withdrawn intermittently from the base of the tank 203 through a spigot 215 until the specific gravity of the slurry falls to the desired minimum. This filter thickener is capable of increasing the specific gravity of, for example, an aqueous suspension of paper coating quality china clay, having a particle size distribution such that about 80 percent by weight consists of particles smaller than 2 microns equivalent spherical diameter, from 1.04 (6 percent by weight of solids) to 1.32 (39 percent by weight of solids) at a throughput of 1,660 lb. of dry solids per hour if the suction period is one-half minute, and at a throughput of 955 lb of dry solids per hour if the suction period is 5 minutes, the back-flushing period being one-half minute in each case.

Figure 8:
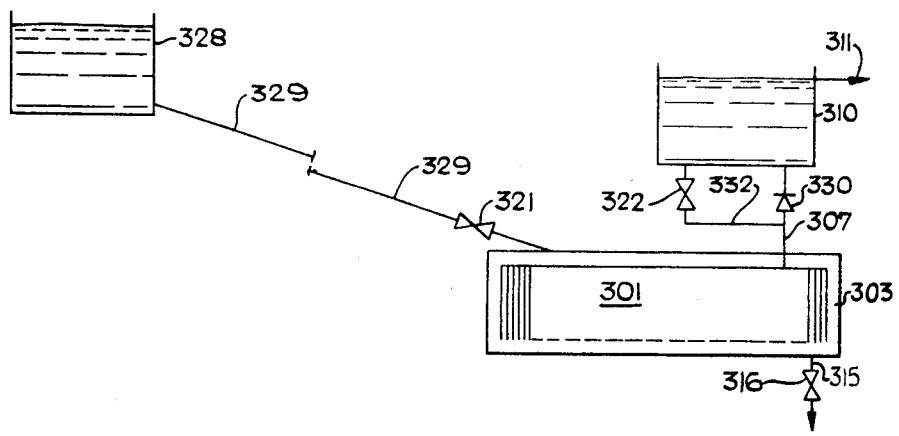

FIG. 8 shows an embodiment of a filter thickener which is especially useful when the suspension is required to be thickened at a location 100 feet or more below the source of the suspension. As mining operations, for example, are often carried out on rising ground this state of affairs frequently obtains. Unthickened suspension is stored in a tank 328 and can flow under gravity down a conduit 329 to a second totally enclosed cylindrical tank 203 containing 60 filter elements 301 each measuring approximately 5 feet by 4 feet. The tank 303 is provided with an outlet conduit 315 which may be closed by a valve 316. The interior of each of the filter elements is connected by means of a conduit 307 to a tank 310 which is situated at a slightly higher level than the tank 303. An overflow conduit 311 is provided to maintain a constant hydraulic head of filtrate in the tank. A non-return valve 330 is provided in conduit 307 and automatic time-controlled valves 321 and 322 are provided respectively in conduit 329 and in a conduit 332 which by-passes the non-return valve 330.

At the start of a cycle valves 316 and 322 are closed and valve 321 opened. Feed suspension flows into tank 303 under the action of the hydraulic pressure due to the height of tank 328 above tank 303 and filtrate is forced through the cloths of the filter elements 301 and through the non-return valve into the tank 310. At the end of the predetermined pressure period, the valve 321 is closed and valves 316 and 322 opened to allow filtrate to flow back through the filter elements to dislodge and flush away the cake. At the end of the back-flushing period, which is usually one-half minute, valves 316 and 322 are closed and valve 321 opened and the cycle begins again. This embodiment has the advantage that no vacuum pumping equipment is required as the filtrate is forced through the filter elements by the action of the hydraulic pressure head alone.

We claim:
1. In a filter thickener comprising:
a tank;
means for supplying a suspension to be thickened to said tank;
at least one filter element in the form of a filter leaf disposed in said tank for submersion in a suspension introduced into said tank;
means for establishing a pressure differential between the exterior and the interior of the filter element whereby filtrate passes from the exterior to the interior of the filter element;
conduit means for conveying filtrate from the interior of said filter element;
means for introducing liquid into the interior of said filter element to discharge thickened suspension adjacent the exterior surface thereof;
the improvement wherein said filter element comprises:
a horizontal pipe;
a flexible flat bag of filter material suspended from said pipe, the flat sides of said bag being secured together to hold said bag in a generally flat configuration, said filter material comprising flexible filter material surrounding said pipe and joined together at its edges to form a closed flexible bag, the flat sides of said flat bag being joined together by stitching extending lengthwise of the bag thus dividing the bag into a plurality of contiguous strips, the flat bag of filter material being suspended from the pipe along substantially the whole length of the top edge of the filter bag, the pipe being disposed substantially horizontally in said tank, a strip along the whole length of the top edge of the filter element being rendered impermeable;
said bag being substantially filled with a flexible packing material through which liquid can permeate, said packing material being selected from the group consisting of flexible mesh and flexible mat; and
said pipe including aperture means extending substantially the length of the pipe and communicating with the interior of said filter element, said pipe being connected to said conduit means for conveying filtrate from the interior of said filter element through said apertures.

2. A filter thickener as claimed in claim 1 wherein said contiguous strips each have a width in the range of from 2 to 6 inches.

3. A filter thickener as claimed in claim 1 wherein the flexible flat bag of filter material is formed from a single piece of material.

* * * * *